May 6, 1952  L. D. DURHAM  2,595,781
PORTABLE LIVESTOCK OR CATTLE SPRAY
Filed Aug. 1, 1947  4 Sheets-Sheet 1
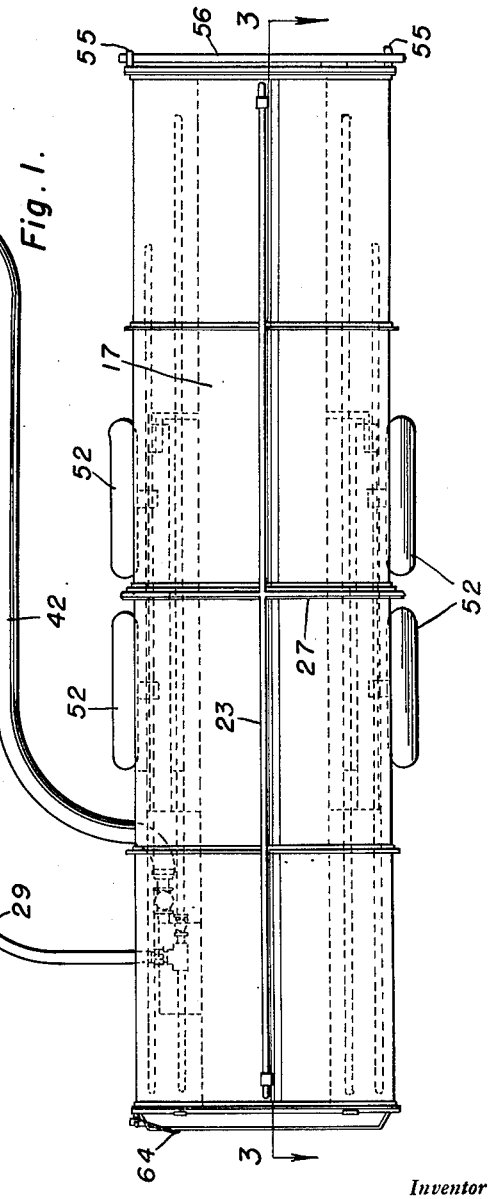
Fig. 1.
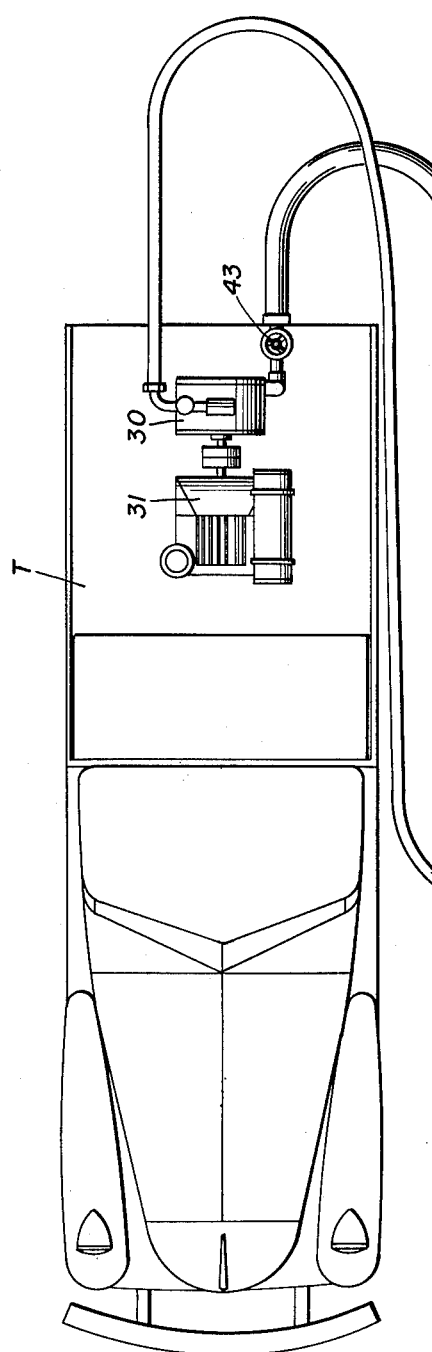
Inventor
Lynn D. Durham
By Clarence A. O'Brien
and Harvey B. Jacobson
Attorneys May 6, 1952  L. D. DURHAM  2,595,781
PORTABLE LIVESTOCK OR CATTLE SPRAY
Filed Aug. 1, 1947  4 Sheets-Sheet 2
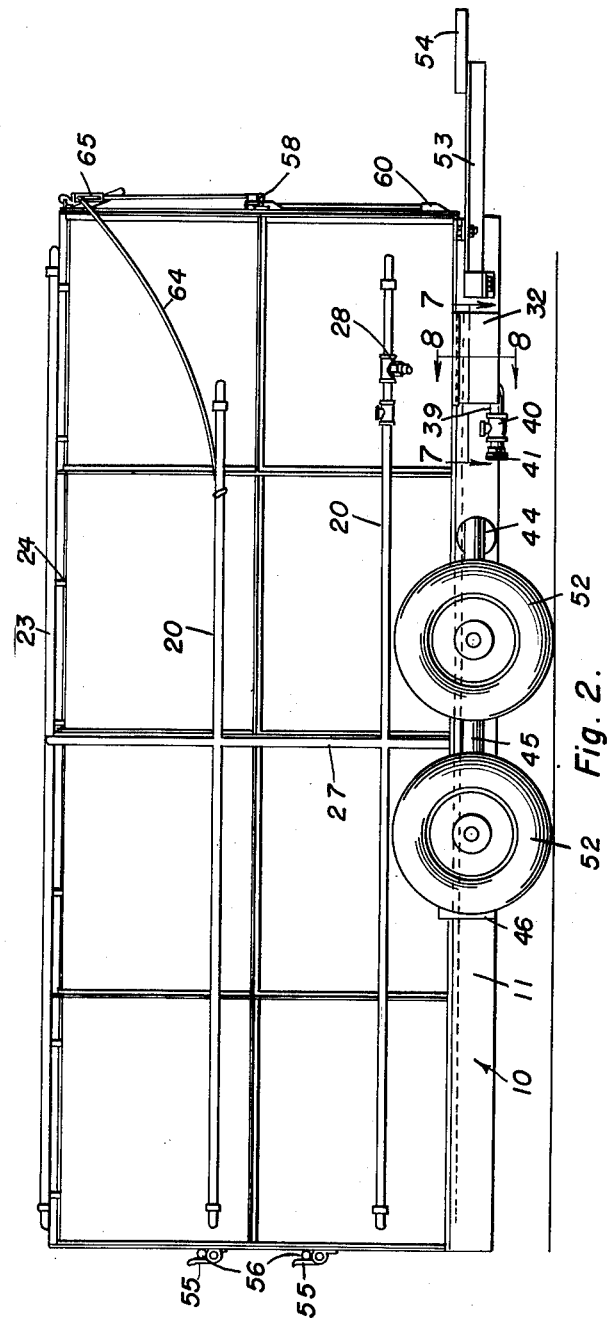
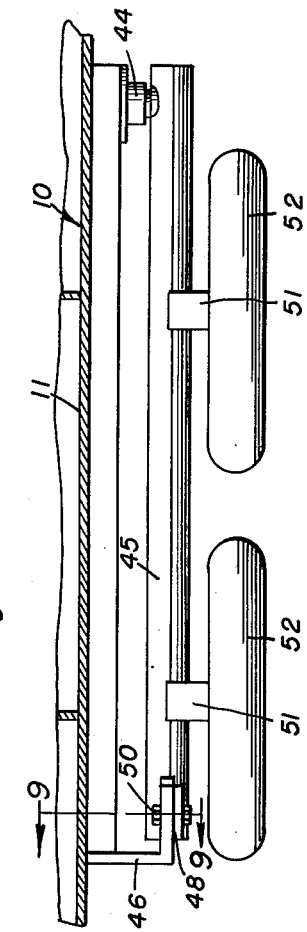
Inventor
Lynn D. Durham May 6, 1952  L. D. DURHAM  2,595,781
PORTABLE LIVESTOCK OR CATTLE SPRAY
Filed Aug. 1, 1947  4 Sheets-Sheet 3
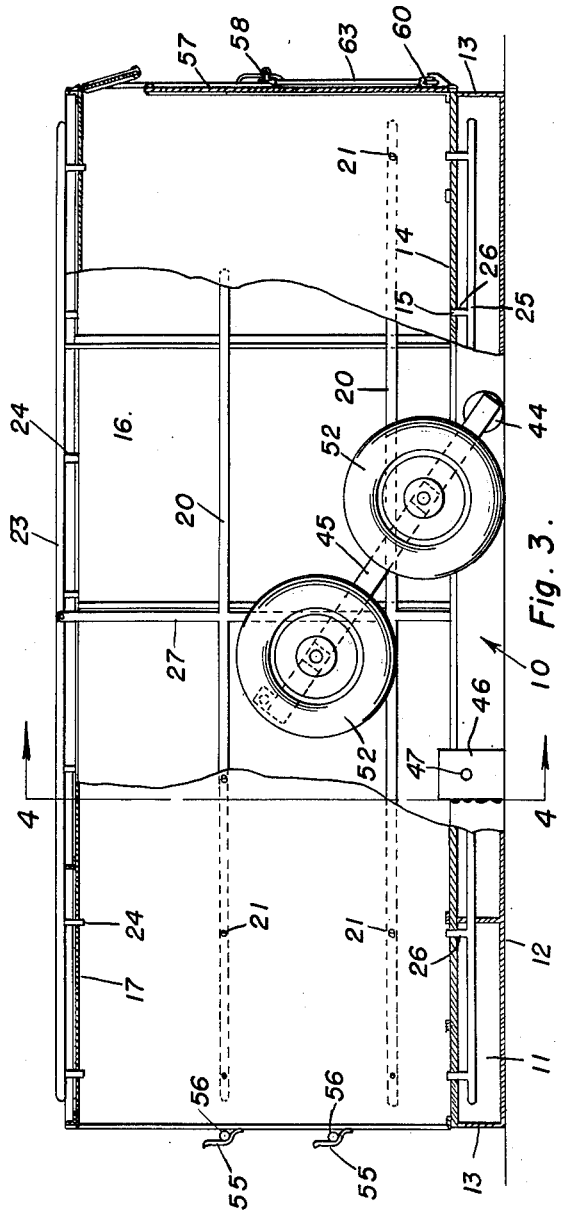
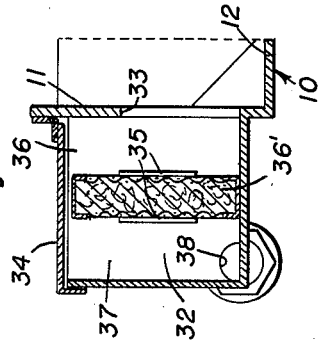
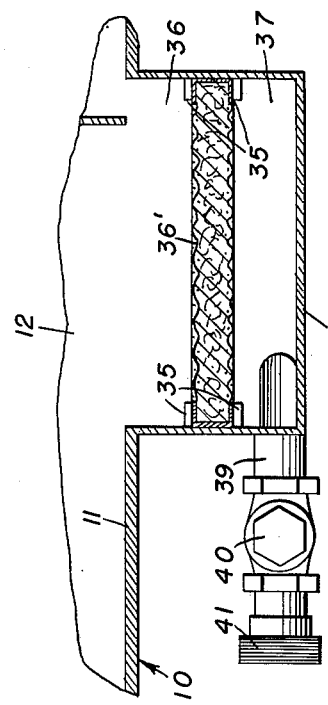
Inventor
Lynn D. Durham

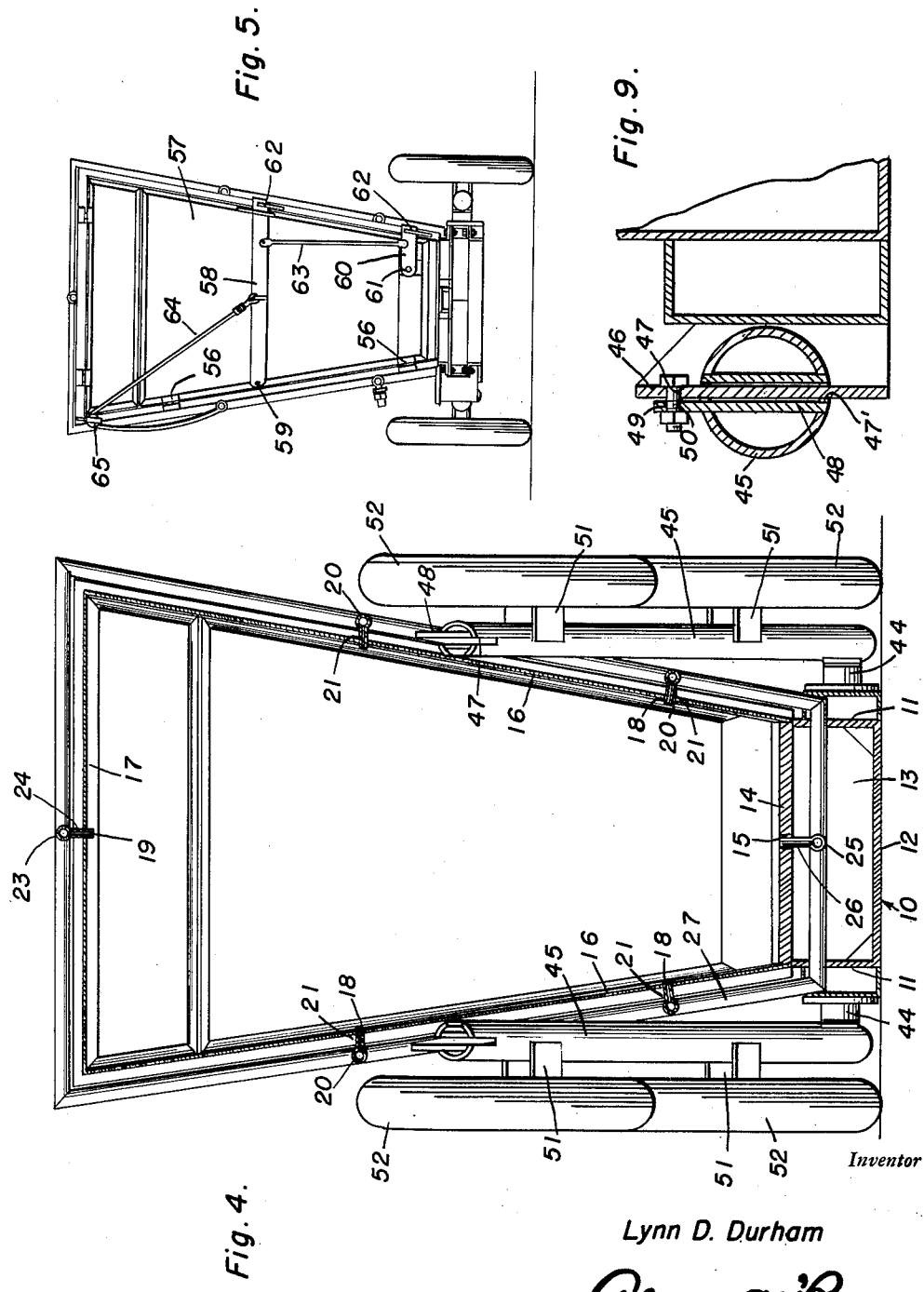

Patented May 6, 1952

2,595,781

UNITED STATES PATENT OFFICE 2,595,781

PORTABLE LIVESTOCK OR CATTLE SPRAY

Lynn D. Durham, Midland, Tex.

Application August 1, 1947, Serial No. 765,333

2 Claims. (Cl. 119—159)

This invention relates to a livestock or cattle spray and more particularly to a spraying device which may be transported from place to place, to conduct spraying operations on herds of cattle or the like.

The primary object of the invention is to facilitate the application to an animal confined within the chute of spray liquid capable of destroying parasites, and generally disinfecting the animal.

Another object is to control and prevent the spread of infectious diseases which might be communicated from one animal to another, and to prevent the spread of such diseases throughout a herd.

A further object is to confine an animal during the spraying operation to insure the adequate application of the spray liquid to all parts of the head and body of the animal.

The above and other objects may be attained by employing this invention which embodies among its features a cattle chute, spray nozzles carried by the cattle chute to direct treating liquid against an animal confined within the chute, a wheel carriage pivoted on each side of the chute to swing in vertical arcs intermediate the ends of the chute, a ground contacting wheel on each carriage and means on each side of the chute releasably to hold the respective carriages in a horizontal position and support the chute on the wheels in spaced relation to the ground during transit.

Other features include an elongated relatively shallow substantially rectangular pan adapted to contain spray liquid, a floor at the top of the pan upon which an animal stands to be sprayed and through which spray liquid drains into the pan, a side wall rising from each longitudinal side edge of the pan, a top at the upper edge of each side wall and forming with the floor and the side walls an enclosed chute in which an animal is confined during the spraying operation, spray pipes carried by the floor the side walls and the top, spray nozzles carried by the spray pipes and directed toward an animal confined in the chute and means to extract spray liquid from the pan and direct it into the spray pipes and through the spray nozzles to spray an animal confined within the chute.

In the drawings:

Figure 1 is a plan view of a cattle spray embodying the features of this invention illustrating the pump therefor mounted on a traction vehicle which may be used for moving the spray chute from place to place;

Figure 2 is a side view of the spray device illustrating it in elevated position and ready for transportation;

Figure 3 is a side view partially in section illustrating the cattle spray in lowered position ready for the spraying operation;

Figure 4 is an enlarged vertical sectional view taken substantially along the line 4—4 of Figure 3;

Figure 5 is an end view of the cattle spray illustrated in Figure 2;

Figure 6 is a fragmentary horizontal sectional view through a portion of the cattle spray illustrating the pivotal connection of one of the wheel carriages thereto;

Figure 7 is an enlarged fragmentary sectional view taken substantially along the line 7—7 of Figure 2;

Figure 8 is an enlarged fragmentary sectional view taken substantially along the line 8—8 of Figure 2, and;

Figure 9 is an enlarged fragmentary sectional view taken substantially along the line 9—9 of Figure 6.

Referring to the drawings in detail this improved cattle spray comprises a bottom designated generally 10 which is formed of a pair of side rails 11 joined at their lower edges by a solid bottom wall 12. End walls 13 join the sides and bottom at opposite ends of the bottom 10 to form an elongated rectangular shallow pan, the purpose of which will be more fully hereinafter explained. Supported on the upper edges of the side rails 11 and extending across the upper end of the pan is a floor 14 formed with longitudinally spaced openings 15, the purpose of which will be more fully hereinafter explained.

Extending upwardly and outwardly from the upper edge of each side rail 11 is a side wall 16, the upper ends of which are joined by a top 17 to form with the bottom 10 a cattle chute which is open at both ends. Formed at spaced intervals in the side walls 16 are openings 18 and similar openings 19 are formed at longitudinally spaced points in the top 17, the purpose of which will more fully hereinafter appear.

Extending longitudinally along the outer sides of the side walls 16 are spray pipes 20 carrying spray nozzles 21 which project through the openings 18 so that liquid flowing through the pipes 20 will be directed inwardly toward an animal confined within the chute. A longitudinally extending spray pipe 23 extends along the outer side of the top 17 midway between opposite sides and this pipe is provided with downwardly directed spray nozzles 24 which enter the openings 19 as will be readily understood upon reference to Figure 4. A similar spray pipe 25 having upwardly directed spray nozzles 26 entering the openings 15 in the floor 14 extends longitudinally of the device midway between opposite sides of the floor, and within the bottom 10. These spray pipes are connected midway between opposite ends to a feed pipe or manifold 27 which as illustrated in Figures 3 and 4 completely encircles the cattle chute substantially midway between opposite ends. One of the supply pipes 20 is provided adjacent one end of the chute with a fitting 28 to which a flexible hose 29 (Fig. 1) is attached. The end of the hose opposite that which is connected with the fitting 28 is coupled to the discharge end of a suitable pump 30 which is preferably carried by the traction vehicle and is driven by a suitable prime mover 31 such as an internal combustion engine.

Carried on one side of the bottom 10 is a box-like chamber 32 which has communication with the interior of the bottom 10 through a passage 33 formed in the side wall 11 adjacent the chamber 32. This chamber is fitted with a removable cover 34 through which access may be had to the interior thereof and carried on opposite end walls of the chamber are spaced parallel guides 35 between which a suitable filter 36' is supported in an upright position substantially midway between opposite sides of the chamber to separate the latter into an inlet compartment 36 and a discharge compartment 37. Formed in one end wall of the chamber 32 and communicating with the discharge compartment 37 is a passage 38 which opens into a discharge pipe 39 to which is coupled one end of a suitable valve 40, the opposite end of which is provided with a suitable coupling 41 by means of which a flexible hose 42 (Fig. 1) is detachably connected to the valve. The end of the hose 42 opposite that which is coupled to the coupling 41 leads through a valve 43 to the intake side of the pump 30, so that when the latter is set into operation liquid will be extracted from the bottom 10 through the filter 36 and drawn into the intake end of the pump, to be discharged through the discharge end of the pump and hose 29 into the spray system represented by the pipes 20, 23 and 25 and the manifold 27. The floor 14 is preferably formed of slats or spaced boards so that the liquids sprayed through the spray nozzles 21, 24 and 26 may fall back into the interior of the bottom 10.

In order to render the device mobile I attach to each side of the bottom 10 a suitable bracket 44 to which is pivotally connected one end of a wheel carriage 45, and fixed to each side of the bottom in spaced relation to the brackets 44 is an angle plate 46 having a bolt receiving opening 47 extending therethrough. The end of each wheel carriage 45 opposite that which is pivoted to the bracket 44 is provided with a slot 47' which as illustrated in Figure 9 is adapted to partially embrace the flange of the angle plate 46, and welded or otherwise fixed in the slot 47' is a plate 48 which projects beyond the side of the wheel carriage 45 and is provided with an opening 49 which is adapted when the carriage is in chute supporting position to align with the opening 47 in the angle plate 46 and to receive a coupling bolt 50 by means of which the wheel carriage 45 is detachably held in chute supporting position. Carried on each wheel carriage 45 in longitudinally spaced relation are brackets 51 on which ground contacting wheels 52 are rotatably mounted. A suitable draw bar 53 is demountably connected to one end of the bottom 10 and is provided with a suitable trailer coupling 54 by means of which the chute may be coupled to a traction vehicle.

Carried at one end of the chute are suitable brackets 55 which are adapted to support in spaced parallel relation horizontally disposed end bars which are adapted to close the end of the chute to prevent the escape of an animal therefrom, and supported on suitable hinges 56 at the opposite end of the chute is a door 57. A latch 58 is pivoted as at 59 to the door 57 intermediate the hinges 56 and a second latch 60 is pivoted as at 61 to the door adjacent the bottom edge thereof. These latches project beyond the edge of the door remote from the hinged edge thereof and are adapted to engage keepers 62 carried by the side wall of the chute opposite that to which the door 57 is hinged. The latches 58 and 60 are coupled by a link 63 so that when one of the latches is moved, the other will move in unison therewith and connected to the latch 58 intermediate its ends is a flexible cable 64 which leads upwardly and over a suitable supporting pulley 65 to be coupled at its opposite end to the uppermost spray pipe 20 on the adjacent side of the chute.

In use the spraying chute elevated and supported on the wheels 52 with the draft tongue 53 coupled thereto is connected by means of the draft tongue to a traction vehicle T upon which the pump 30 and the prime mover 31 therefor is mounted. The flexible hoses 29 and 42 may be carried on the traction vehicle or on the cattle spray which ever may be most convenient it being understood of course that the hoses are first uncoupled from the couplings 28 and 41 and from the opposite sides of the pump 30 to facilitate their proper storage for transportation. The spray device is then moved by means of the traction vehicle T to the desired point whereupon the coupling tongue 53 is disconnected from the spray and the bolts 50 are extracted from the openings 47 and 49, thus permitting the wheel carriages 45 to swing about their respective pivots 44 into the position illustrated in Figure 3 so as to permit the bottom 10 to rest directly on the ground. The bars 56 are then placed in position in their respective brackets 55 and the door 57 is opened by exerting pull on the cable 64 and lifting the latches 58 and 60 respectively to allow the door to swing open on its hinges 56. The hoses 29 and 42 are then coupled to the outlet and inlet sides of the pump 30 and to their respective couplings 28 and 41 of the spray device. An animal to be sprayed is then driven into the spray chamber defined by the floor 14, side walls 16 and top 17, and standing on the floor 14 is sprayed by setting the pump 30 into operation. It will be understood of course that the reservoir or container formed by the bottom 10 has previously been filled with spraying liquid by pouring it into the chamber 26 after the cover 34 has been removed. With the pump operating it will be evident that the spray liquid will be drawn through the intake hose 42 and discharged through the hose 29 into the spray system defined by the pipes 20, the manifold 27 and the pipes 23 and 25 to be discharged through the spray nozzles 21, 24 and 26 and projected against all parts of the animal confined within the chute. The excess spray liquid flows through the floor 14 back into the reservoir defined by the bottom 10 ready for reuse. It will be understood of course that as the spray liquid leaves the reservoir it is filtered by the filter 36' so that any hair or other foreign matter which may drain with the liquid from the animal will be collected by the filter 36' which may from time to time be removed and cleansed or replaced. When a herd or group of animals has been properly sprayed, the device may again be transported to another location simply by jacking up the body until the bolt holes 47 and 49 align and thrusting the bolt 50 therethrough. The draft tongue is then reconnected to the spray device and upon disconnecting the hoses and placing them in position for transit, the spray device may again be coupled to the traction vehicle for transportation.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A mobile cattle spraying chute comprising a relatively flat narrow elongated rectangular pan, a floor closing the top of said pan, said floor having a longitudinal row of longitudinally spaced vertical openings extending therethrough, upwardly extending diverging side walls carried by the floor adjacent opposite side edges of the floor, said side walls having vertically spaced horizontal rows of longitudinally spaced horizontal openings therein, a top carried by the side walls, said top having a longitudinal row of longitudinally spaced vertical openings therein, a horizontal spray pipe carried by the floor within said pan, a horizontal spray pipe carried by the top above the upper side thereof, vertical spray nozzles connected to the spray pipes and extending through the openings in the floor and in the top, horizontal spray pipes carried by the side walls on the outer sides thereof, horizontal spray nozzles connected to the last mentioned spray pipes and extending through the openings in the side walls, a manifold encircling said floor, side walls and top and extending transversely through said pan substantially midway between opposite ends of the chute and connected to the spray pipes to feed spray liquid thereto, a filtering unit mounted on the pan at one side thereof, said filtering unit being connected to the pan to receive spray liquid therefrom, means connected to the filtering unit to extract filtered liquid therefrom, said means being connected to the manifold to direct liquid extracted from the filtering unit into the spray pipes and through the spray nozzles onto an animal within the chute.

2. A mobile cattle spraying chute comprising a relatively flat narrow elongated rectangular pan, a floor covering said pan and having a longitudinal row of longitudinally spaced vertical openings therein, upwardly diverging side walls carried by the floor adjacent opposite side edges of the floor, a top carried by said side walls, said top having a longitudinal row of longitudinally spaced vertical openings therein, a horizontal spray pipe carried by the floor within said pan, a horizontal spray pipe carried by the top above the upper side thereof, vertical spray nozzles connected to said spray pipes and extending through the openings in the floor and top, a manifold encircling said floor, side walls, and top and extending transversely through said pan substantially midway between opposite ends of the chute and connected to the spray pipes to feed spray liquid thereto, a filtering unit mounted on the pan at one side thereof and being connected to the pan to receive spray liquid therefrom, means connected to the filtering unit to extract filtered liquid therefrom, said means being connected to the manifold to direct liquid extracted from the filtering unit into the spray pipes and through said nozzles onto an animal within the chute.

LYNN D. DURHAM.

REFERENCES CITED

The following references are of record in the file of this patent:

UNITED STATES PATENTS

| Number | Name | Date |
| --- | --- | --- |
| 774,279 | Seabury | Nov. 8, 1904 |
| 870,766 | Eaton | Nov. 12, 1907 |
| 883,132 | Goff | Mar. 24, 1908 |
| 1,511,450 | Findlay | Oct. 14, 1924 |
| 1,767,560 | Snyder | June 4, 1930 |
| 2,216,328 | Spangler | Oct. 1, 1940 |
| 2,480,600 | Paul | Aug. 30, 1949 |
| 2,480,909 | Davis | Sept. 6, 1949 |
| 2,524,641 | Suttles | Oct. 3, 1950 |
| 2,529,530 | Abildgaard et al. | Nov. 14, 1950 |